United States Patent
Milazzotto et al.

(10) Patent No.: US 6,909,258 B2
(45) Date of Patent: Jun. 21, 2005

(54) CIRCUIT DEVICE FOR DRIVING AN AC ELECTRIC LOAD

(75) Inventors: Antonino Milazzotto, Rodano (IT); Mario Di Guardo, Gravina di Cantania (IT); Antonino Cucuccio, Catania (IT); Francesco Di Marco, Mascalucia (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 10/274,276

(22) Filed: Oct. 18, 2002

(65) Prior Publication Data

US 2003/0117820 A1 Jun. 26, 2003

(30) Foreign Application Priority Data

Oct. 19, 2001 (EP) ............................................. 01830664

(51) Int. Cl.[7] ........................... H02P 5/408; H02P 7/628
(52) U.S. Cl. ...................... 318/811; 318/800; 318/807; 318/809; 318/812; 318/813
(58) Field of Search ................................. 318/811, 813, 318/599, 800, 767, 807, 809, 812; 363/71, 124

(56) References Cited

U.S. PATENT DOCUMENTS

| 4,495,557 A | * | 1/1985 | Weit ............................ 363/89 |
| 5,309,348 A | * | 5/1994 | Leu ............................. 363/71 |
| 5,506,484 A | * | 4/1996 | Munro et al. ............... 318/599 |
| 6,194,881 B1 |   | 2/2001 | Parker et al. ............... 323/237 |
| 6,329,786 B1 | * | 12/2001 | Ono ........................... 320/113 |

FOREIGN PATENT DOCUMENTS

| AT | 390 532 B | 5/1990 |
| EP | 0 334 100 A2 | 9/1989 |
| EP | 0 891 036 A2 | 1/1999 |
| EP | 1 017 156 A1 | 7/2000 |

* cited by examiner

Primary Examiner—David Martin
Assistant Examiner—Tyrone Smith
(74) Attorney, Agent, or Firm—Lisa K. Jorgenson; Dennis M. de Guzman; Seed IP Law Group

(57) ABSTRACT

A circuit device is provided for driving an AC electric load, of the type inserted between a terminal of an AC power supply line and a terminal of the electric load to be driven and including a generator of PWM signals to be transferred to the load. This circuit is an AC/AC converter adapted to power supply the load from any level of the power supply line sinusoid and comprising first and second voltage driven switches, the first switch to power supply the load and the second switch to enable loop-back of the current. The switches always operate in a complementary manner, i.e., when the first switch is on, the other is off, and vice versa.

28 Claims, 9 Drawing Sheets

CIRCUIT DEVICE FOR DRIVING AN AC ELECTRIC LOAD

BACKGROUND OF THE INVENTION

1. Field of the Invention

The present invention relates to a circuit device for driving an alternating current (AC) load.

The invention relates, particularly but not exclusively, to a circuit device which is inserted between a terminal of an AC power supply line and a terminal of an electric load to be driven, and includes a generator of PWM signals to be transferred to the load.

2. Description of the Related Art

As it is well known in the relevant art, the simplest way of varying the supply voltage of a single-phase AC electric motor, or to a resistive/inductive load, is that of using a partialized phase Triac device effective to partialize the supply voltage to the motor.

Briefly, for varying the voltage applied to an AC electric load, it has been known to drive electric motors with the sinusoid of the supply voltage partialized by controlling the conduction angle of a thyristor.

This is a cost-effective technique that has been in use for decades, but has a problem in that harmonics are introduced in the current waveform of the power supply line, resulting in a low efficiency of the whole system.

European standards, e.g., Standard No. EN 61000-3-2, place strict limitations on the harmonic contents of line current, and the use of circuit devices that are based on bridge structures producing PWM (Pulse Width Modulation) signals, known for being less "fouling" in terms of introducing harmonics, provides at present a much-favored solution.

The expanded use of non-linear loads, with its attendant increase of harmonic currents in the supply line, in recent years has led regulatory technical boards to set upper limits on the harmonic contributions from industrial and household appliances.

Accordingly, the manufacturers of such appliances are to adjust the specifications for their ranges to bring them within the new standard of operation.

It has been proposed to solve the problem by using more or less complicated and costly inverter systems, adapted to lower the harmonic contents of currents with respect to the load. Circuits of this kind employ inverter-type DC/AC switches that allow a sinusoidal voltage to be output, the amplitude and frequency of which can be varied individually. These prior art circuits are based on bridge circuits adapted to generate PWM signals. The DC voltage is conventionally obtained by rectifying and filtering the supply line voltage.

For instance, a rectifying diode is connected in parallel to a filter capacitor and a switch having its ends connected to the electric motor or to any electric load, such as a lamp or an electric oven. An approach of this type is described in the European Patent Application No. 98830809.4, for example.

However, not even these approaches have succeeded to lower the harmonic contents with respect to the supply line, because of the presence at the input of supply stages that employ rectifying bridges and filter capacitors, both introducing current distortions.

In all cases, inverter systems involve double conversion, AC to DC at the input and DC to AC at the output, as well as the use of complex modulation and control techniques normally implemented by microcontrollers that raise the system cost unacceptably in low-end applications.

The underlying technical problem of this invention is to provide a circuit device for driving AC electric loads, which device should have appropriate structural and functional features to allow a direct connection of the load to the AC power supply line, and to drastically reduce the likelihood of current harmonics being introduced in the power supply line, thereby overcoming the limitations and obviate the drawbacks of the solutions provided by the prior art.

BRIEF SUMMARY OF THE INVENTION

The principle on which an embodiment of this invention stands is the one of connecting the circuit directly to the AC power supply line without any preliminary AC-to-DC conversion, and driving the load from a whatever level of the power supply line sinusoid, thereby allowing the load demagnetization through a current loop-back system and obtaining a voltage regulation on the load and a current form that is equal to the one that would be obtained by connecting the load directly to the power supply line.

Thus, the circuit device according to one embodiment of the invention could be useful to any AC loads, regardless of the amount of load current-voltage offset involved, and its applicability could be extended to include all types of AC single-phase motors, such as the motors used for driving refrigerating compressors, water pumps, air-conditioning fans, etc.

The features and advantages of the circuit device according to the invention will be apparent from the following detailed description of an embodiment thereof, given by way of non-limitative example with reference to the accompanying drawings.

DETAILED DESCRIPTION OF THE INVENTION

Figure 1:
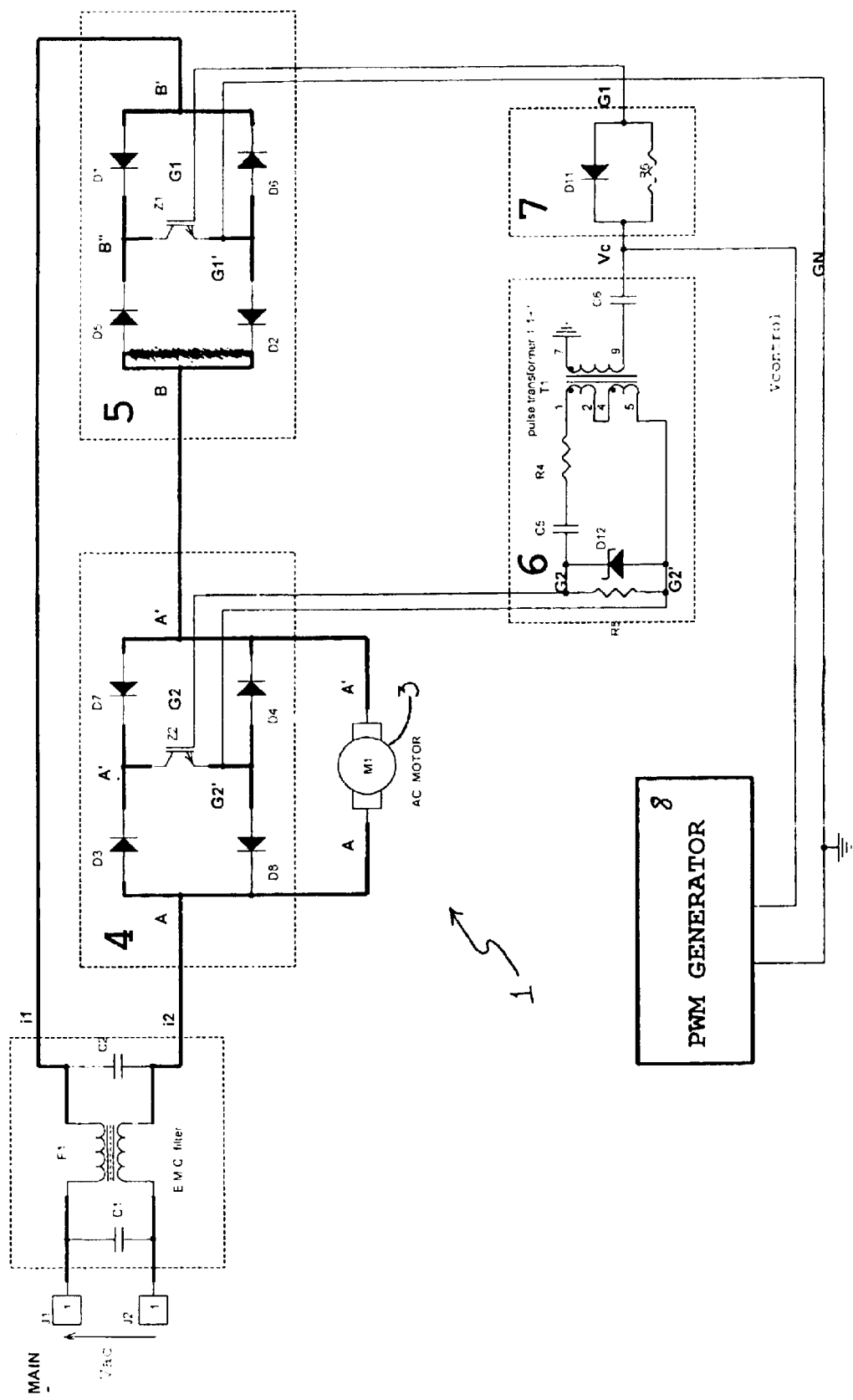
FIG. 1 schematically shows a circuit device for driving AC electric loads, according to an embodiment of the invention.

Embodiments of a circuit device for driving an AC electric load are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

With reference to the drawing views, a circuit device for driving an AC electric load 3, realized according to an embodiment of the present invention, is generally shown at 1 in schematic form.

The electric load 3 may be any single-phase electric motor, as used for driving a compressor, a refrigerator, a water pump, an air-conditioning fan, etc.

The basic structure of the inventive circuit 1 can be viewed as that of a double chopper operated from a sinusoidal source supplied directly by the power supply line at 50–60 Hz, i.e., with no AC-to-DC preliminary conversion provided.

The double chopper is a device able to power supply a load 3 from any level on the power supply line sinusoid, and to enable demagnetization of the load 3 through a current loop-back system, such that a regulated voltage Vload to the load 3 and a current form same as the form to be obtained by connecting the load directly to the power supply line are afforded.

This means that, when the original current form is a true sinusoid, the regulated current will also be sinusoidal at all the power levels to be transferred to the load.

Neglecting losses through electronic devices, the power input P to the circuit 1 is equal to the output power, as follows:

$$P = Vac \cdot Iac = Vload \cdot Iload$$

and the following proportion apply to the currents:

$$\frac{Iload}{Iac} = \frac{Vac}{Vload}$$

where, Vac and Iac are the voltage and current, respectively, of the input supply; and Vload and Iload are the output voltage and current, respectively, from the system, i.e., the voltage and current supplied to the load.

Briefly, the circuit 1 is operated as a converter, specifically an AC-to-AC converter.

Once the power to be transferred is set, a larger load current than the power supply line current Iac can be obtained, as the output voltage is lower.

The circuit 1 according to an embodiment of the invention has no limitations as regards load type, and can be used with any resistive/inductive loads, even at large offset values, i.e., large phase angles between the current and the voltage.

This feature expands the circuit application fields to all the AC loads without exceptions and allows exchange of reactive power between the load and the power supply line, during the load energizing phases, unlike what conventional circuits can do, in which the power is partly dissipated through the electronic control section.

Thus, the overall system efficiency is improved and losses are reduced. In addition, efficiency is further enhanced by that all the diodes used for driving the two loop-back bipolar transistors provided in the circuit of the aforementioned European patent have been removed.

The construction of this circuit 1 will now be described in detail. An embodiment will first be described which includes two voltage-controlled switches. A modified embodiment will then be described which makes use of two bipolar transistors and a single voltage-controlled switch.

In the first embodiment, the circuit 1 comprises four basic blocks as shown in FIG. 1, a line filter F1 and a PWM signal generator 8.

A first block 4 is directly supplied from the AC power supply line through the filter F1. This first block 4 is to provide for the current from the load 3, i.e., from a motor M1, to flow unrestrictedly. The block 4 comprises a power switch element Z2 that may be, for example, an IGBT or a POWER MOS transistor, or another type of voltage-controlled fast switch, and a set of short reverse recovery time diodes D3, D4, D7, D8. The switch Z2 is inserted between two opposed nodes of a bridge diode circuit comprising the diodes D3, D4, D7, D8 and connected to the load.

The block 4 has an input node A and an output node A', which nodes correspond to nodes of the diode bridge circuit and are connected to the opposed ends of the motor M1.

A second block 5 is the main switching block and intended to power supply the load M1 during the Ton phase of the PWM signal. The construction of the block 5 is similar to that of the block 4 and includes a main power switch element Z1 and a set of diodes D1, D2, D5, D6 having short reverse recovery times.

The switch element Z1 may also be an IGBT or a POWER MOS transistor, or another fast voltage-controlled switch. The switch Z1 is inserted between opposed nodes of a diode bridge structure comprising the diodes D1, D2, D5, D6.

The block 5 has an input node B connected to the node A', and an output node B' connected to the power supply line at the output of the filter F1.

A third block 6 is a driving device adapted to produce an exact transfer of the PWM signal from the PWM generator into the nodes G2–G2' of the switch Z2, thereby electrically isolating the input from the output and phase inverting the input signal, as explained hereinafter. The block 6 is input a signal Vcontrol from the PWM signal generator, and has a pair of outputs connected to respective terminals of the switch element Z2.

A fourth or delay block 7 ensures proper operation of the circuit. This block 7 is adapted to compensate for the delays introduced by those components which behave less than ideally. The block 7 is input the signal Vcontrol from the PWM signal generator, and has an output connected to the control terminal of the switch element Z1.

The two switch elements Z1 and Z2 always operate in a truly complementary manner, that is, when Z1 is 'on', Z2 is 'off', and vice versa, this being a necessary condition to avoid the occurrence of a true short-circuit to the power supply line.

In general, AC loads exhibit a phase delay of voltage relative to current, unless they are purely resistive loads.

Figure 2:
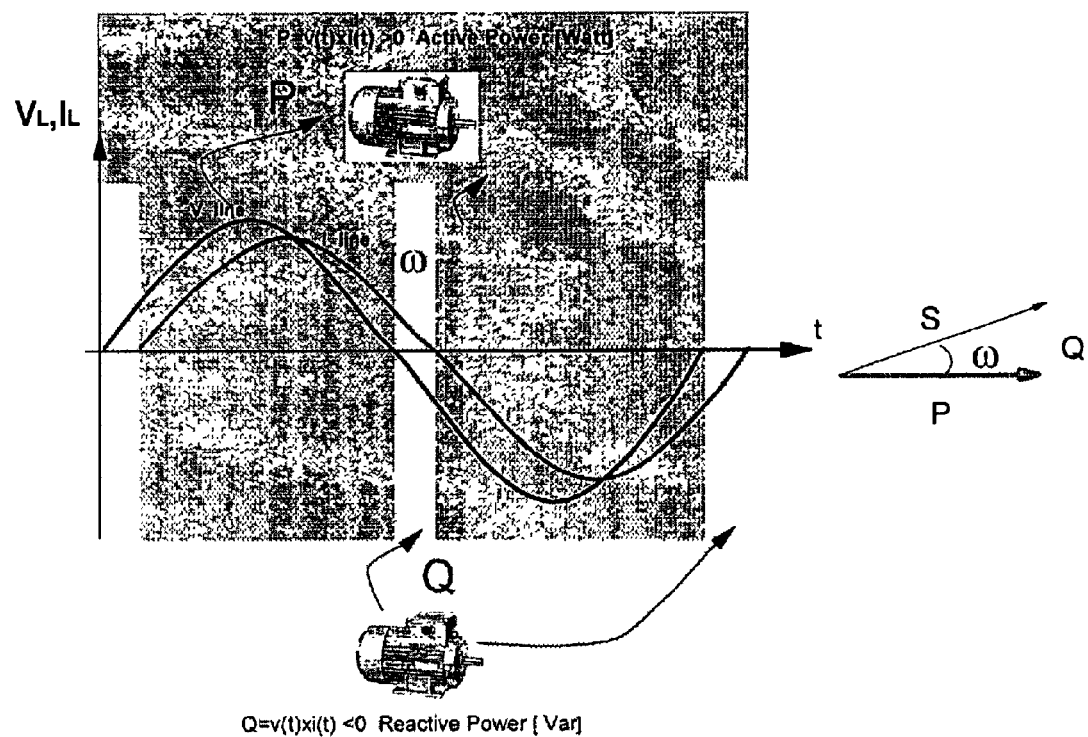
FIG. 2 schematically shows current and voltage waveforms absorbed by an AC supplied electric motor.

Schematically shown in FIG. 2 are the patterns of the sinusoidal drive signals to the motor M1, and of the offset between voltage and current.

It can be seen in FIG. 2 that the load has phases when the power P is positive, and phases when P is negative. During the latter, the load returns energy by performing essentially a generator function.

Let us assume the power supply line voltage to be positive with respect to the terminal J1 and in a sinusoidal state with expended transients.

At any one point on the power supply line positive half-wave, the switch Z1 is closed at a time t=0 and held ON for a time tON of the PWM control signal, this being the energizing phase to the load.

If the main switch Z1 is closed at a time when the current is positive, the current will flow along a path from the input terminal J1 to the load M1 through the components D1, Z1, D2. Since switch Z2 is 'off', there can be no internal paths through the first block 4.

Conversely, if the switch Z1 is closed at a time when the current is negative, the current flow path will go from the terminal J1 and back through the load M1 and the components D5, Z1, D6.

Figure 4:
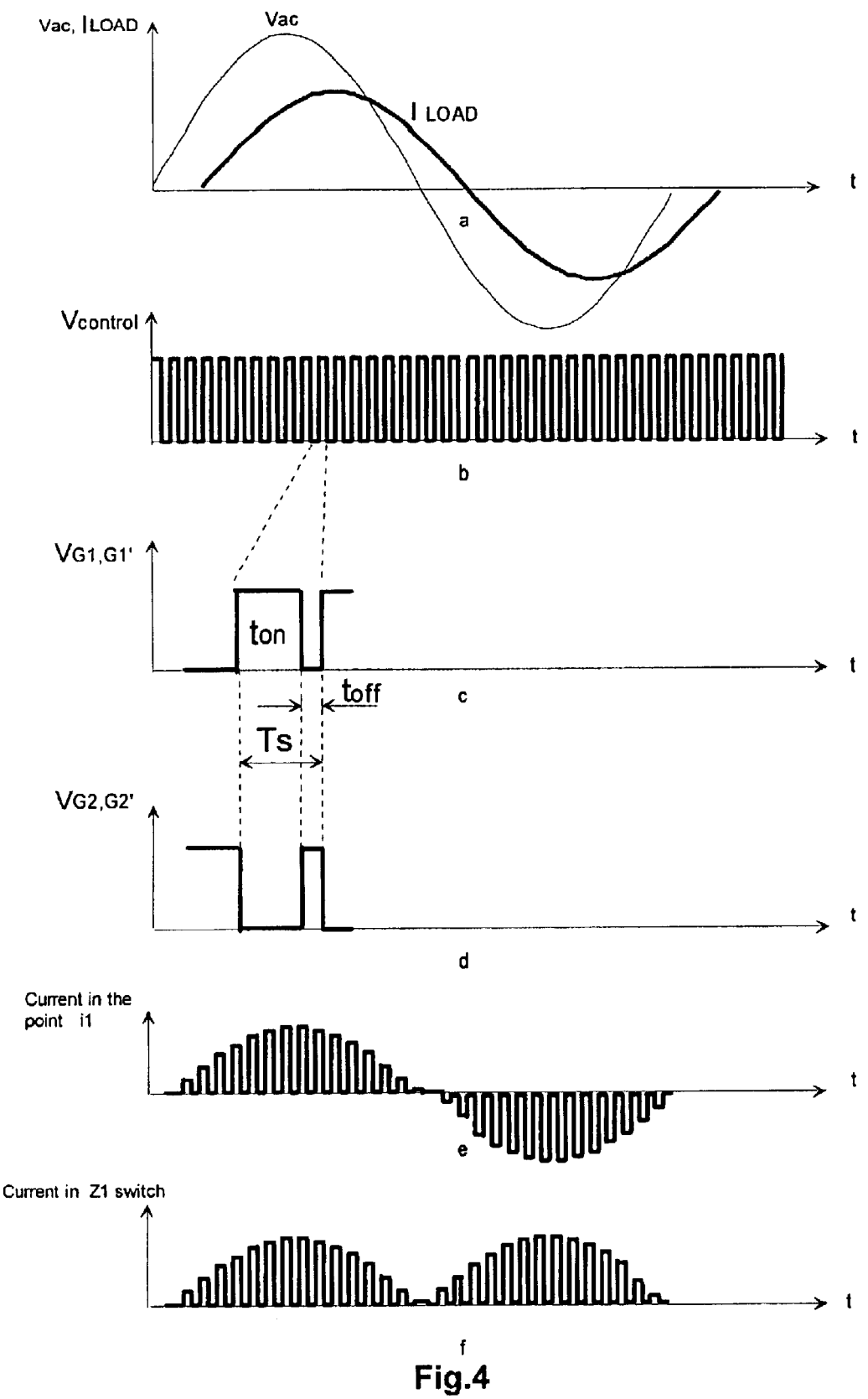
FIGS. 4a to 4d respectively show graphs, plotted against the same time base, of voltage signals in the circuit device according to an embodiment of the invention.
FIGS. 4e and 4f respectively show graphs, plotted against the same time base, of current signals in the circuit device according to an embodiment of the invention.

At a time t=Toff, the switch Z1 is turned off, with the switch Z2 being turned on and held 'on' throughout Toff. Consequently, an instant interruption will occur in the current at point I1, while Z2 initiates the current loop-back phase. This situation is schematized in FIG. 4e.

The current is allowed to go back through D3, Z2 and D4 if the current previously supplied to the motor, i.e., the current during the power supply phase, has been flowing in the direction from node A' to node A. Otherwise, the current is allowed to go through D7, Z2 and D8, if the previous current has been flowing in the direction from node A to node A'.

The result of this flow is a voltage $V_{AA''}$ to the motor, which voltage bears the following relation to the power supply line voltage Vac:

$$V_{AA'} = V_{MAX} \cdot \sin(\omega t)$$

while the current is:

$$I_{load} = \frac{1}{\delta} \cdot I_{ac} = \frac{1}{\delta} \cdot I_{MAX} \sin(\omega t + \varphi)$$

where φ is the phase angle of the current with respect to the voltage.

Figure 3:
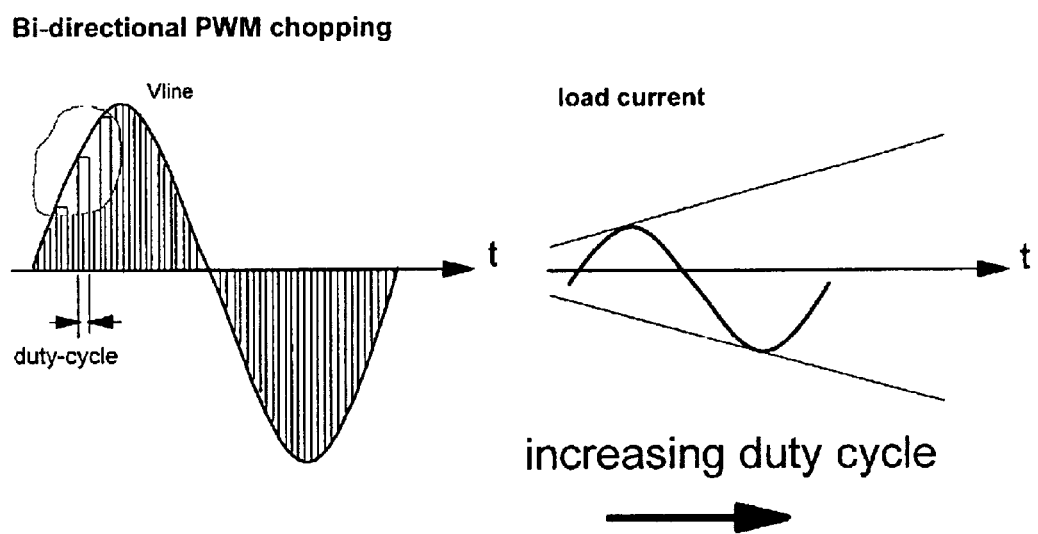
FIG. 3 schematically shows the duty cycle of an AC motor.

By acting on the duty cycle of the control signal, the power transferred to the load can be adjusted as schematically shown in FIG. 3, while retaining the sinusoidal form of the current through the filtering effect of the inductive nature of the load.

The duty cycle variable is defined as:

$$\delta = \frac{ton}{ton + toff} = \frac{ton}{Ts}$$

where Ts is the fixed switching period.

FIGS. 4a to 4d are graphs of voltage vs. time, plotted against the same time base, showing the patterns of control signals that are present in the circuit 1 for driving the two switches Z1 and Z2. Graphs 4e and 4f show current waveforms at point I1 and inside the switch z1 against time.

The construction of the third block 6, used for driving the loop-back circuit comprising the switch Z2 and the diodes D3, D4, D7, D8, will now be described in detail.

The block 6 comprises a pulse transformer T1, a pair of filter capacitors, and an output stage comprising a parallel of a resistor and a Zener diode.

Figure 5:
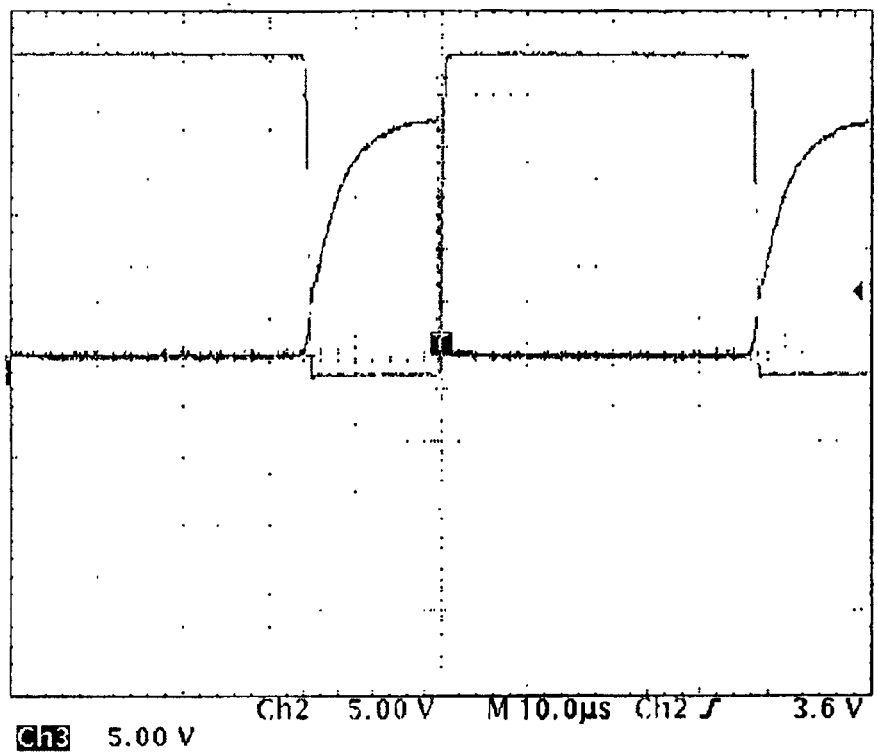
FIGS. 5 and 6 respectively show schematic views of a basic B-H flow diagram for a transformer incorporated in the circuit according to an embodiment of the invention.

This block 6 functions to transfer, to the first block 4, sufficient power to turn on/off the switch element Z2, and functions to keep the signal from the PWM block galvanically isolated, at the same time as it performs the aforementioned phase inversion required for complementary operation of Z1 and Z2, as indicated in FIG. 1 by the arrangement of dots on the pulse transformer T1, in conformity with the current flow directions indicated in FIGS. 1 and 5.

The output signal from the PWM generator block 8, i.e., the voltage signal Vcontrol, is here a unipolar signal, positive relative to ground GND, and can be originated by any programmable microcontroller or oscillator.

Figure 6:
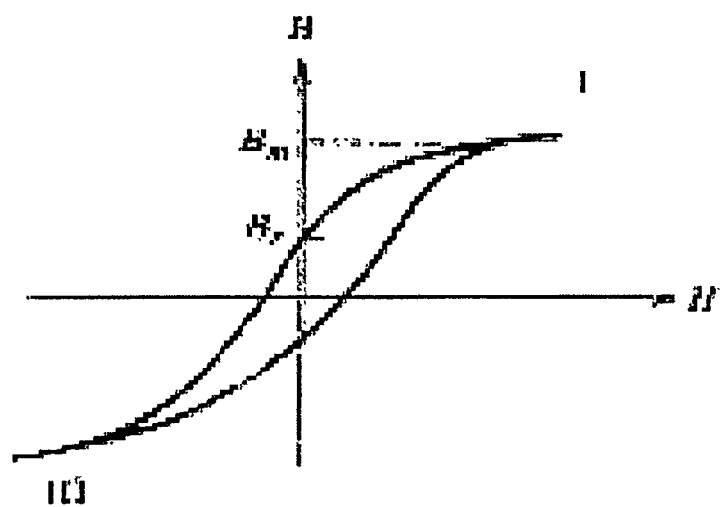

The capacitors C5 and C6 function to filter out the DC component of the PWM signal Vcontrol, so that the core of the pulse transformer T1 can symmetrically work within a B-H diagram (quadrants I and III) as shown in FIG. 5. This avoids the saturated condition shown in FIG. 6.

In series with the capacitor C5 is a current limiting resistor R5, while a unidirectional type of signal, negated with respect to the control signal to Z2, is found at the nodes G2 and G2' by means of the Zener diode D12, which signal has the following duty cycle:

$$\delta' = 1 - \delta$$

The delay block 7 will now be discussed. This block 7 comprises a parallel of a resistor R6 and a diode D11, and is arranged to cause the rising edge of the control signal at point Vc to be slightly delayed by acting on the time constant due to R6 and on the gate capacitance of G1, while leaving the falling edge unaffected.

This provides for minimum blanking time between the two control signals G1 and G2. Also, this blanking time should be related to the reverse recovery time trr of all the diodes provided in the circuit.

All these diodes should be of the fast type, so as to have less current overshoot peaks upon the switch Z1 being turned on.

In practice, the length of the reverse recovery time trr of the diodes provided in the circuit will vary between a minimum of 20 ns in systems intended for loads of a few hundred watts, and a maximum of 40 ns in systems intended for loads in the range of 1 kW.

Thus, the number of switches needed for switching the load supply has been reduced compared to conventional circuits.

A modified embodiment of the circuit according to the invention will now be described with reference, in particular, to FIG. 7.

This modified embodiment has a basic structure that corresponds to that described in European Patent No. 98830809.4, but has none of the fall diodes that are used there in order to obtain suitable drive voltages for the two current loop-back BJT transistors, thereby removing all the losses that their use involves.

Similar as in the previous embodiment, a filter F1 is inserted between the circuit 10 and the AC power supply line. Furthermore, a PWM signal generator 8 drives a power switch Z3 directly by means of a signal Vcontrol.

Figure 7:
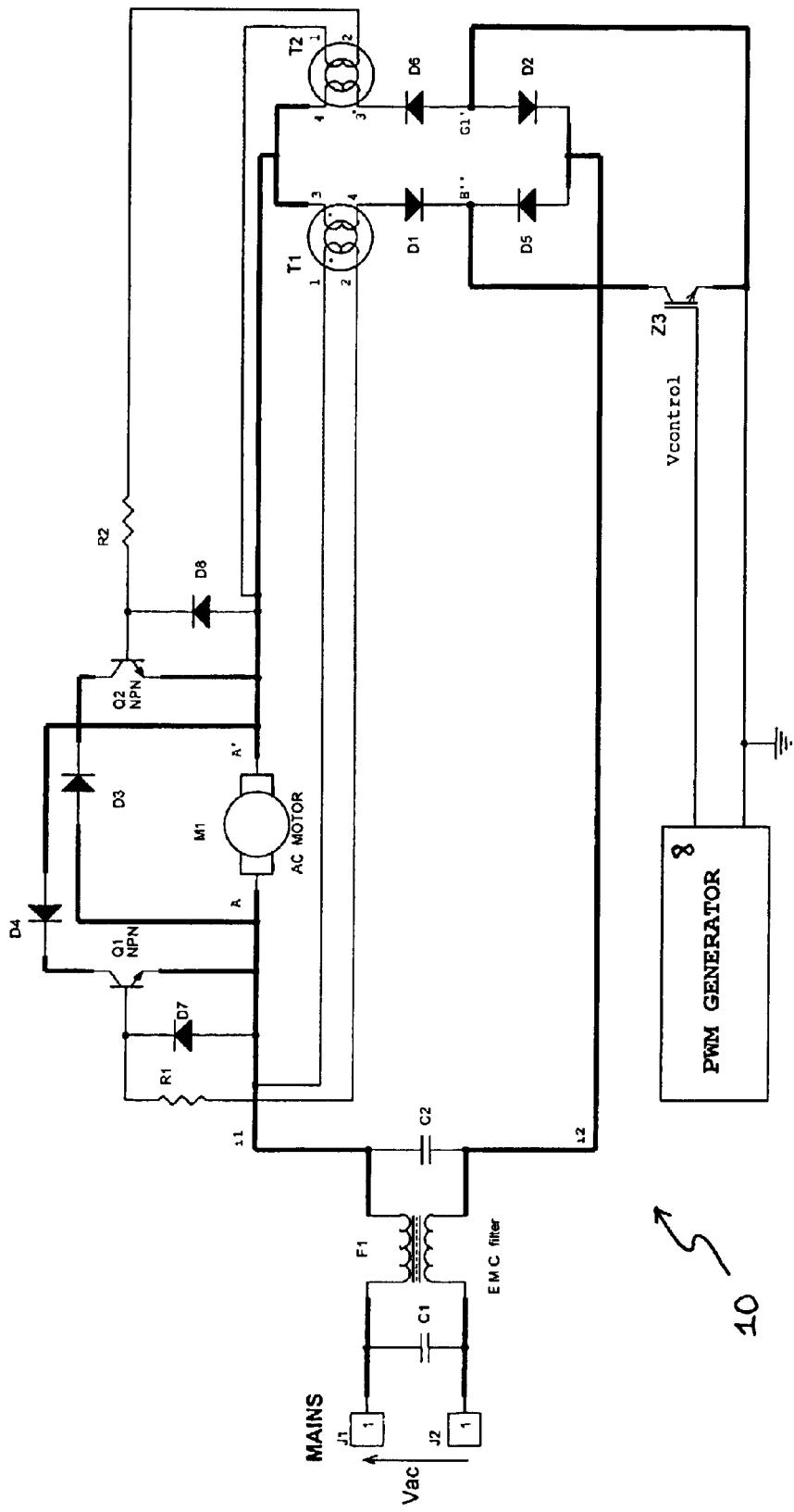
FIG. 7 schematically shows a modified embodiment of the circuit device according to the invention.

Referring to FIG. 7, it is seen that each end node A, A' of the motor M1 is associated respective conduction terminals of first and second BJT transistors Q1 and Q2 intended for current loop-back purposes.

These transistors Q1, Q2 receive, each on its base terminal, a respective drive signal. Advantageously, the drive signals to Q1 and Q2 are electrically isolated from each other, and are complements of the signal used for driving the switch Z3. Each drive signal is present only during its relevant current half-period.

The principle is again that of holding the loop-backs 'off' during the motor powering phase, which occurs during the ton period of the main switch. The loop-back paths are 'on' during the toff phase of the switch Z3, the criterion being one of discriminating their turning on according to the current sign, and of allowing alternative connection of the diodes D4 and D3 to the motor.

In this modified embodiment, drive is achieved by means of two small ring transformers T1 and T2, which have the pulse currents due to continued opening/closing of Z3 flowed through their primaries. These transformers are supplied by the power supply line through a bridge of diodes D1, D2, D5 and D6.

The primaries of the transformers T1 and T2 may be connected in the circuit in a non-invasive manner for the diode bridge D1–D6, i.e., with the leads passing inside the rings, if desired in order to keep manufacturing costs low.

Figure 8:
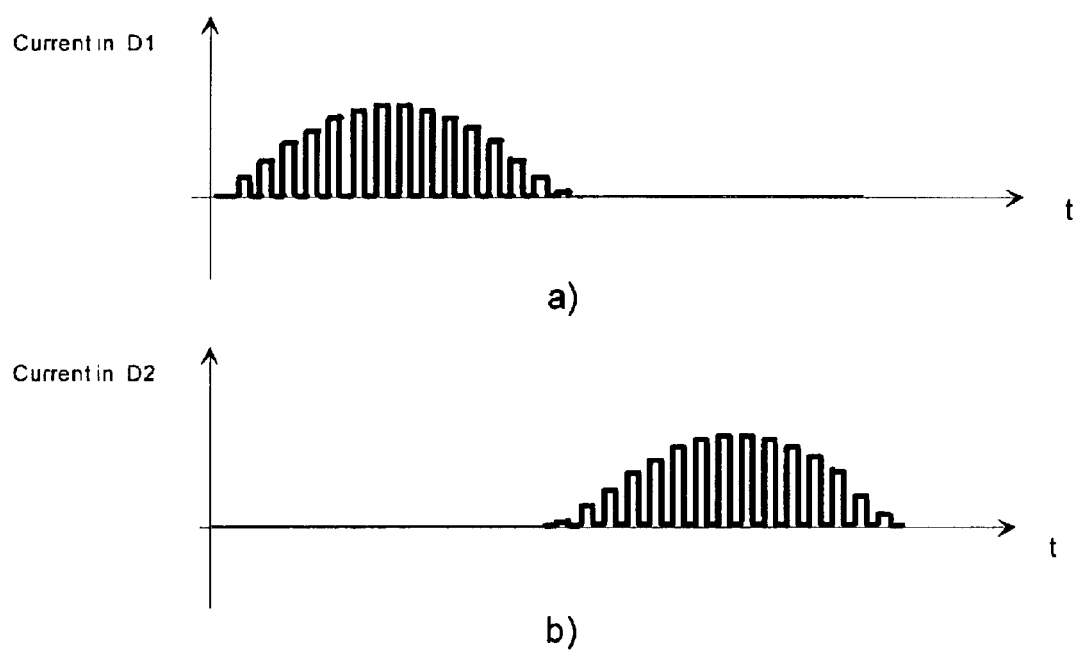
FIGS. 8a and 8b respectively show graphs, plotted against the same time base, of current signals in the circuit device shown in FIG. 7.

In particular, the current across the transformer T1 will be there only during the positive half-period of the current to the motor. This situation is illustrated by the graph of FIG. 8a. Across the ends of the other transformer T2, current will appear only during the negative half-period, as shown in FIG. 8b.

The signal on the secondaries of the transformers T1 and T2 is used, after inverting its phase, for driving the loop-back bipolar transistors Q1 and Q2, while the diodes D7 and D8 provided ensure that the signal be clamped, preventing the reverse voltage across the secondaries of T1 and T2 from exceeding the maximum reverse voltage of the base-emitter junction.

Having a negative voltage across the two secondaries during the ton time facilitates turning off the two bipolar transistors; this reverse voltage value being, however, limited to Vforward of the diodes D7 and D8.

Both embodiments of the circuit device according to the invention solve the technical problem, while affording a number of advantages, foremost among which is that its usability is not limited to low power factor loads, i.e., with current-voltage phase angles close to zero.

The system allows the voltage to be adjusted by modulation at a low third harmonic contents compared to traditional phase partializers. This is apparent from a comparison of the graphs in FIGS. 9 to 12.

Figure 9:
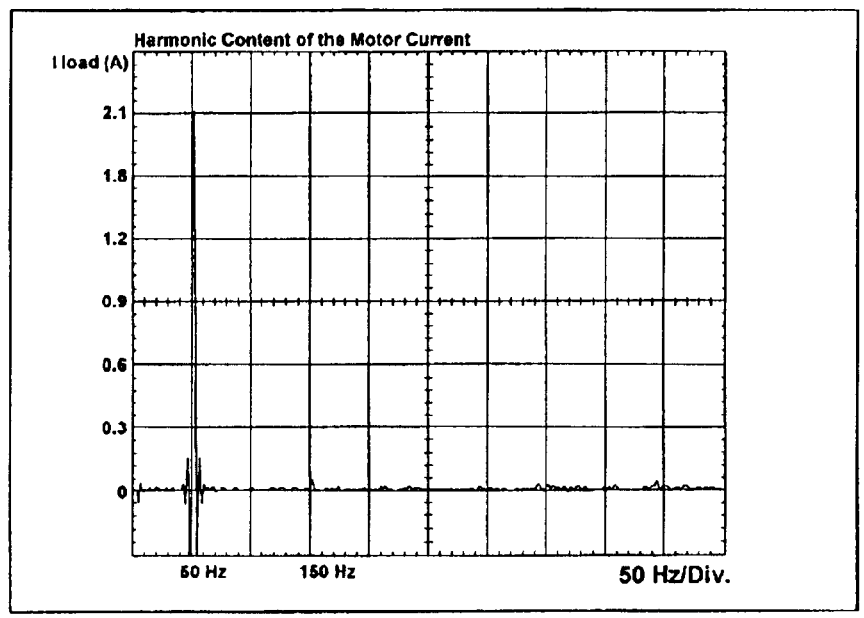
FIGS. 9 and 10 are comparative diagrams.
Figure 10:
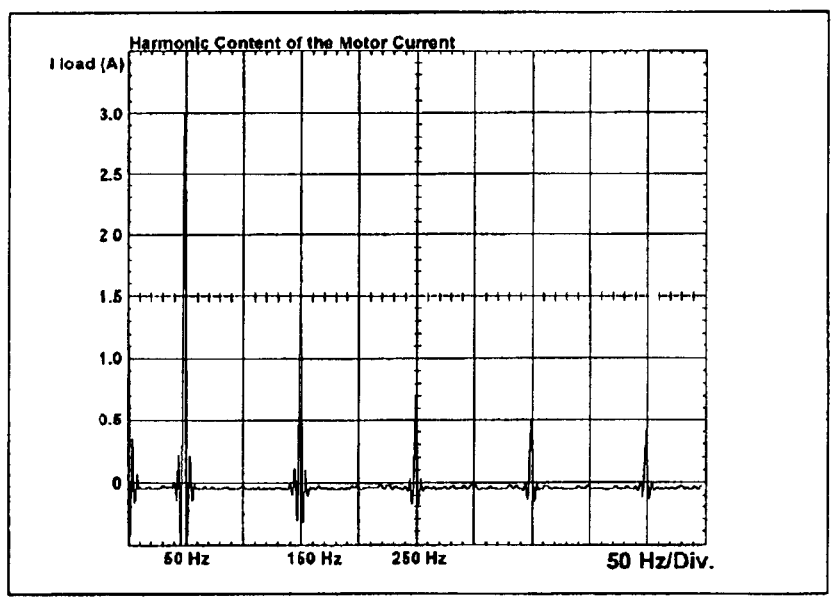
Figure 11:
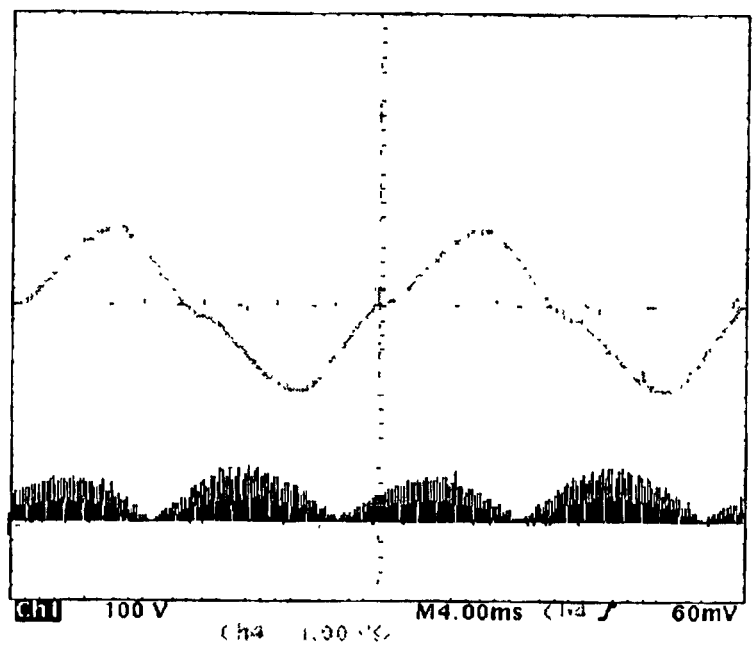
FIGS. 11 and 12 respectively show current waveforms in the sinusoidal load and in the power supply line.
Figure 12:
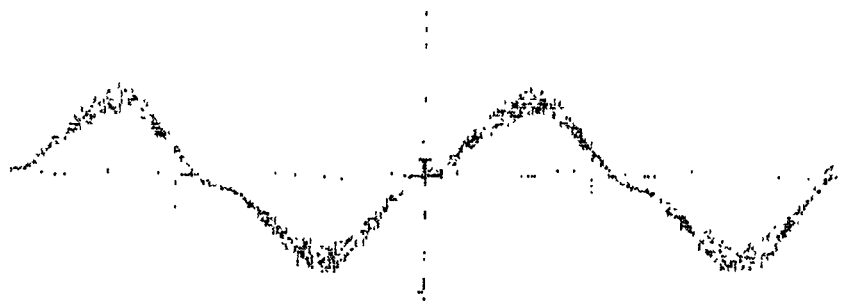

More particularly, FIG. 9 illustrates the harmonic contents of the current to the motor obtained by the PWM driving technique according to an embodiment of the invention. FIG. 10 illustrates the harmonic contents of the current to the motor when the conventional technique of partializing the phase with a Triac is used, for the same torque and speed. FIG. 11 shows (top) the waveform of the current to the motor and (bottom) the form of the voltage in the main switch Z1 of the proposed solution. Finally, FIG. 12 shows the current waveform of the power supply line current, evidencing a switching frequency component that can be filtered out using low-cost filters.

The voltage applied to the motor can be controlled linearly by simply controlling the duty cycle of the PWM signal on the control terminal of the main switch. This affords improved control characteristics compared to those provided by a mere Triac, with the voltage applied to the motor that varies according to a quadratic law.

Unlike inverter systems, this system requires no separated supply portion by AC-to-DC conversion. The filtering section, moreover, is made smaller and less expensive than in inverter systems, by the switching frequency being high (typically, 20 kHz).

Also noteworthy is the absence of the torque pulses that affect the phase partialization technique, resulting in less vibration of mechanical parts, supports, etc.

Both embodiments of the invention can be used for driving any AC loads, such as motors, lamps, etc., at any angles of the current-voltage phase.

This allows the user to choose between these embodiments according to standing costs, without compromises on operability.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A circuit device for driving an AC electric load, of a type inserted between a terminal of AC power supply line and a terminal of the electric load to be driven, the circuit device comprising:
   a generator of PWM signals to be transferred to the load;
   an AC/AC converter to power supply the load from any level of the power supply line sinusoid; and
   first and second voltage driven switches, the first and second switches each having only a single transistor respectively controlled by a pair of control signals from the PWM generator, the first switch to power supply the load and the second switch to enable loop-back of current, said switches always operating in a complementary manner, wherein when the first switch is on, the second switch is off, and wherein when the first switch is off, the second switch is on.

2. Device according to claim 1, further comprising a third switch, voltage driven by a signal from said PWM generator, said third switch driving the first and second switches through respective transformers.

3. Device according to claim 1 wherein the first switch is voltage driven by a signal from said PWM generator through a delay block.

4. Device according to claim 1 wherein said second switch is voltage driven by a signal from said PWM generator through a driving block including a pulse transformer and being intended to keep the load galvanically isolated from the PWM generator.

5. Device according to claim 1 wherein said first switch is a power transistor inserted in a main switch block supplying the load between two opposed nodes of a diode bridge.

6. Device according to claim 1 wherein said second switch is a power transistor inserted in a secondary switch block enabling the load current loop-back between two opposed nodes of a diode bridge.

7. A circuit device for driving an AC electric load, of a type inserted between a first terminal of an AC power supply line and a terminal of the electric load to be driven and including a generator of PWM signals to be transferred to the load, the circuit device comprising:

a first circuit block to allow current from said load to flow unrestrictedly, said block being connected between a second terminal of said power supply source and a second circuit block;

the second circuit block being connected to the first terminal of said power supply line to power said load upon said generator being turned on;

a third circuit block to transfer a signal from said generator into said first circuit block; and a fourth circuit block connected to said second circuit block to compensate for introduced delays.

8. A circuit device for driving an AC electric load, of the type inserted between a terminal of an AC power supply line and a terminal of the electric load to be driven and including a generator of PWM signals to be transferred to the load, the circuit device comprising:

first and second associated switches for driving respective terminals of the load, the first and second switches each having only a single transistor respectively controlled by a pair of control signals from the PWM generator; and a third switch voltage driven by a signal from said PWM generator, the third switch being used for driving the first and second switches through respective transformers.

9. Circuit device according to claim 8, further comprising a diode bridge is connected between said third switch and the transformers.

10. An apparatus, comprising:

a first circuit block having a first switch to allow loop-back load current to flow if the first switch is turned on for off times of a PWM control signal;

a second circuit block coupled to the first circuit block and having a second switch that is complementary to the first switch of the first circuit block, the second switch being turned on to allow power to be supplied for on times of the PWM control signal; and a third circuit block coupled to the first circuit block to transfer the PWM control signal to the first circuit block to turn the first switch on or off, the first and second switches each having only a single transistor respectively controlled by a pair of signals.

11. The apparatus of claim 10, further comprising a fourth circuit block coupled to the second circuit block to compensate for delays.

12. The apparatus of claim 10 wherein the third circuit block includes a third switch, the apparatus further comprising:

another first switch in the first circuit block; and respective transformers coupled to each of the first switches in the first circuit block, the third switch being coupled to drive the first switches through their respective transformer in a manner that the first switches are on if the third switch is off and are off if the third switch is on.

13. The apparatus of claim 10 wherein the third circuit block includes:

a transformer;

a pair of filter capacitors, each coupled to a different winding of the transformer; and an output stage having a diode in parallel with a resistor.

14. The apparatus of claim 11 wherein the fourth circuit block includes a resistor in parallel with a diode.

15. The apparatus of claim 10 wherein the first and second circuit blocks each include a diode bridge.

16. A method comprising:

generating a PWM control signal;

power supplying a load from a power converter;

turning on a first switch and turning off a second switch during off times of the PWM control signal, to allow loop-back current to flow from the load;

and turning off the first switch and turning on the second switch during on times of the PWM control signal, to allow current to flow into the load, wherein turning the first and second switches on or off includes turning only a single transistor of each first and second switches on or off based on a pair of respective control signals.

17. The method of claim 16, further comprising compensating for a delay.

18. The method of claim 16 wherein turning the first and second switches on includes driving these switches with the PWM control signal.

19. The method of claim 16, further comprising:

turning on another first switch during off times of the PWM control signal;

driving a third switch with the PWM control signal; and driving the first switches with the third switch through respective transformers for the first switches.

20. The method of claim 16, further comprising:

driving the second switch to turn it on with the PWM control signal in cooperation with a transformer; and galvanically isolating the load from a generator that provides the PWM control signal.

21. A circuit device for driving an AC electric load, of a type inserted between a terminal of AC power supply line and a terminal of the electric load to be driven, the circuit device comprising:

a generator of PWM signals to be transferred to the load;

an AC/AC converter to power supply the load from any level of the power supply line sinusoid; and first and second voltage driven switches, the first switch to power supply the load and the second switch to enable loop-back of current, said switches always operating in a complementary manner, wherein if the first switch is on, the second switch is off, and wherein if the first switch is off, the second switch is on, wherein said second switch is voltage driven by a signal from said PWM generator through a driving block including a pulse transformer and being intended to keep the load galvanically isolated from the PWM generator.

22. A circuit device for driving an AC electric load, of a type inserted between a terminal of AC power supply line and a terminal of the electric load to be driven, the circuit device comprising:

a generator of PWM signals to be transferred to the load;

an AC/AC converter to power supply the load from any level of the power supply line sinusoid; and first and second voltage driven switches, the first switch to power supply the load and the second switch to enable loop-back of current, said switches always operating in a complementary manner, wherein if the first switch is on, the second switch is off, and wherein if the first switch is off, the second switch is on, wherein said first switch is a power transistor inserted in a main switch block that supplies the load between two opposed nodes of a diode bridge.

23. A circuit device for driving an AC electric load, of a type inserted between a terminal of AC power supply line and a terminal of the electric load to be driven, the circuit device comprising:

a generator of PWM signals to be transferred to the load;

an AC/AC converter to power supply the load from any level of the power supply line sinusoid; and first and second voltage driven switches, the first switch to power supply the load and the second switch to enable loop-back of current, said switches always operating in a complementary manner, wherein if the first switch is on, the second switch is off, and wherein if the first switch is off, the second switch is on, wherein said second switch is a power transistor inserted in a secondary switch block enabling the load current loop-back between two opposed nodes of a diode bridge.

24. An apparatus, comprising:

a first circuit block having a first switch to allow loop-back load current to flow if the first switch is turned on for off times of a PWM control signal;

a second circuit block coupled to the first circuit block and having a second switch that is complementary to the first switch of the first circuit block, the second switch being turned on to allow power to be supplied for on times of the PWM control signal;

a third circuit block coupled to the first circuit block to transfer the PWM control signal to the first circuit block to turn the first switch on or off; and a fourth circuit block coupled to the second circuit block to compensate for delays.

25. An apparatus, comprising:

a first circuit block having a first switch to allow loop-back load current to flow if the first switch is turned on for off times of a PWM control signal;

a second circuit block coupled to the first circuit block and having a second switch that is complementary to the first switch of the first circuit block, the second switch being turned on to allow power to be supplied for on times of the PWM control signal;

a third circuit block coupled to the first circuit block to transfer the PWM control signal to the first circuit block to turn the first switch on or of, the third circuit block including a third switch;

another first switch in the first circuit block; and respective transformers coupled to each of the first switches in the first circuit block, the third switch being coupled to drive the first switches through their respective transformer in a manner that the first switches are on if the third switch is off and are off if the third switch is on.

26. An apparatus, comprising:

a first circuit block having a first switch to allow loop-back load current to flow if the first switch is turned on for off times of a PWM control signal;

a second circuit block coupled to the first circuit block and having a second switch that is complementary to the first switch of the first circuit block, the second switch being turned on to allow power to be supplied for on times of the PWM control signal; and a third circuit block coupled to the first circuit block to transfer the PWM control signal to the first circuit block to turn the first switch on or off, the third circuit block including:

a transformer;

a pair of filter capacitors, each coupled to a different winding of the transformer; and an output stage having a diode in parallel with a resistor.

27. An apparatus, comprising:

a first circuit block having a first switch to allow loop-back load current to flow if the first switch is turned on for off times of a PWM control signal;

a second circuit block coupled to the first circuit block and having a second switch that is complementary to the first switch of the first circuit block, the second switch being turned on to allow power to be supplied for on times of the PWM control signal, the first and second circuit blocks each including a diode bridge; and a third circuit block coupled to the first circuit block to transfer the PWM control signal to the first circuit block to turn the first switch on or off.

28. A method comprising:

generating a PWM control signal;

turning on a first switch and turning off a second switch during off times of the PWM control signal, to allow loop-back current to flow from a load;

turning off the first switch and turning on the second switch during on times of the PWM control signal, to allow current to flow into the load, wherein turning the first and second switches on or off includes turning only a single transistor of each first and second switches on or off based on a pair of respective control signals; and compensating for a delay.

* * * * *